Patented May 4, 1943

2,318,046

UNITED STATES PATENT OFFICE 2,318,046

METHOD OF TREATING PROTEIN

Frederick C. Bersworth, Verona, N. J., assignor to The Martin Dennis Company, Newark, N. J., a corporation of New Jersey No Drawing. Application October 24, 1940, Serial No. 363,109

4 Claims. (Cl. 260—119)

This invention relates to chemistry and more particularly to organic chemistry and has for its object the provision of a method for converting protein into amino acid amides. Another object is to provide an economically practical method of treating natural proteins such as soy bean meal, casein, albumin, sugar beet residues, and the like organic materials to convert the same into chemically useful products. Other objects and advantages will be apparent as the invention is more fully hereinafter disclosed.

In accordance with these objects, I have discovered that protein, particularly the protein content of the natural protein materials above identified, may be hydrolyzed by an organic alkali such as an amine and water at elevated temperatures and preferably in a closed system at atmospheric or more elevated pressures and that in the presence of an excess of the organic alkali the hydrolyzed product will react with the excess organic alkali to form substituted amino compounds which appear to be of the general formula that characterizes amino acid amides, but of different composition than any heretofore obtained and possessing unusual properties indicating great utility as intermediate compounds in general organic synthesis.

As one specific embodiment of the present invention, but not as a limitation thereof, casein may be converted into an amino acid amide of unknown composition by adding 300 grams of casein to a solution consisting of 200–300 grams of an organic alkali, such as ethylene diamine in excess of the amount theoretically required to react with the casein, and from 1500 to 2000 grams of water and heating the mixture in an autoclave to a temperature within the range 100–200° C. for a prolonged time interval (3–15 hours).

The gelatinous mixture first formed on adding the casein to the organic alkali solution is gradually converted into amino acid amides of unknown composition but having a plurality of amino groups as the heating is continued under the steam pressure generated at the temperature of heating in the autoclave. The progress of the conversion reaction may be followed by the gradual loss in biuret reaction and complete conversion is indicated by a change in the iso-electric point of the protein being treated and by the complete solubility of the material in inorganic acid solutions of any pH concentration.

The rate of the conversion reaction may be accelerated to a considerable degree by adding from 5 to 25% (by weight—based on the weight of protein used) of caustic alkali (NaOH; KOH) to the above solution. The caustic alkali appears to facilitate the hydrolysis of the protein to amino acid, thereby shortening the time interval of heating to obtain substantially complete conversion.

In the above specific embodiment, any of the natural protein materials, soy bean meal, sugar beet residues, albumin, and the like may be substituted for the casein without essential departure therefrom. With such substitution the amount of organic alkali used may vary somewhat from that specified for use with casein, inasmuch as the amount of organic alkali required is that amount sufficient to react substantially completely with the hydrolyzed protein to form amino acid amides with the amino acids obtained on the hydrolysis of the protein.

Any other organic alkali or amine may be employed in place of ethylene diamine, as one skilled in the art will readily perceive, without essential departure from the present invention, and the amino-acid amides obtained will be analogous in structure to those obtained with ethylene diamine although different in composition.

Having hereinabove described the present invention generically and specifically and given one specific embodiment of the practice of the same, it is believed apparent that the same may be widely varied without essential departure therefrom and all such modifications and adaptations are contemplated as may fall within the scope of the following claims.

What I claim is:

1. The method of treating naturally occurring proteins of the group consisting of casein, soy bean meal, albumin and sugar beet residues, to convert the same into amino acid amides which comprises suspending the protein in a solution consisting of a mixture of ethylene diamine and water, heating the same in a container closed to the atmosphere to a temperature within the range 100–200° C. under the pressure generated therein, the amount of said amine being at least sufficient to react substantially completely with the protein hydrolysates formed.

2. The method of claim 1, wherein said solution contains in addition to said amine and water an amount of a caustic alkali ranging from about 5 to about 25% by weight of the weight of the said protein.

3. The method of converting casein to an amino acid amide which comprises adding the casein to an aqueous amine solution in the relative proportions of 300 grams of casein to a solution consisting of 200–300 grams of ethylene diamine and from 1500–2000 grams of water, and heating the mixture in a container closed to the atmosphere and under the pressure generated therein to temperatures within the range 100–200° C.

4. The method of claim 3, wherein a caustic alkali of the group consisting of NaOH and KOH in an amount from 5 to 25% by weight of the casein present is added to the said solution.

FREDERICK C. BERSWORTH.